G. W. KILLIN.
RUBBERLESS TIRE FOR MOTOR VEHICLES.
APPLICATION FILED SEPT. 29, 1910.

1,003,186.

Patented Sept. 12, 1911.

Witnesses:
David Johnson.
F. L. Hersey.

Inventor:
George W. Killin,

COLUMBIA PLANOGRAPH CO., WASHINGTON, D. C.

UNITED STATES PATENT OFFICE.

GEORGE W. KILLIN, OF HUNTINGTON, WEST VIRGINIA.

RUBBERLESS TIRE FOR MOTOR-VEHICLES.

1,003,186.     Specification of Letters Patent.     Patented Sept. 12, 1911.

Application filed September 29, 1910. Serial No. 584,566.

*To all whom it may concern:*

Be it known that I, GEORGE W. KILLIN, a citizen of the United States, residing at Huntington, in the county of Cabell and State of West Virginia, have invented certain new and useful Improvements in Rubberless Tires for Motor-Vehicles, Motor-Cycles, and the Like, of which the following is a specification.

My invention relates to improvements in wheels, and particularly those used on motor vehicles, motor cycles and the like.

The object of my invention is to produce a cushioned wheel which will be more economical in construction and more durable in use than those now upon the market.

It is a further object of my invention to produce an entirely rubberless tire for vehicles and one which is practically the equivalent of the pneumatic tire so commonly used.

My invention consists chiefly in a steel rim provided with stout steel springs, a floating rim inside of said outer steel rim, plates bolted to the outside of said outer rim, and a series of levers pivoted to one of the outside plates provided with rollers at the ends thereof, engaging said floating rim and said springs, said levers being mounted in said manner to produce an even strain on all four springs at all times.

My invention further consists in certain novel parts and combination of parts as will hereinafter be set forth and claimed.

Figure 1:
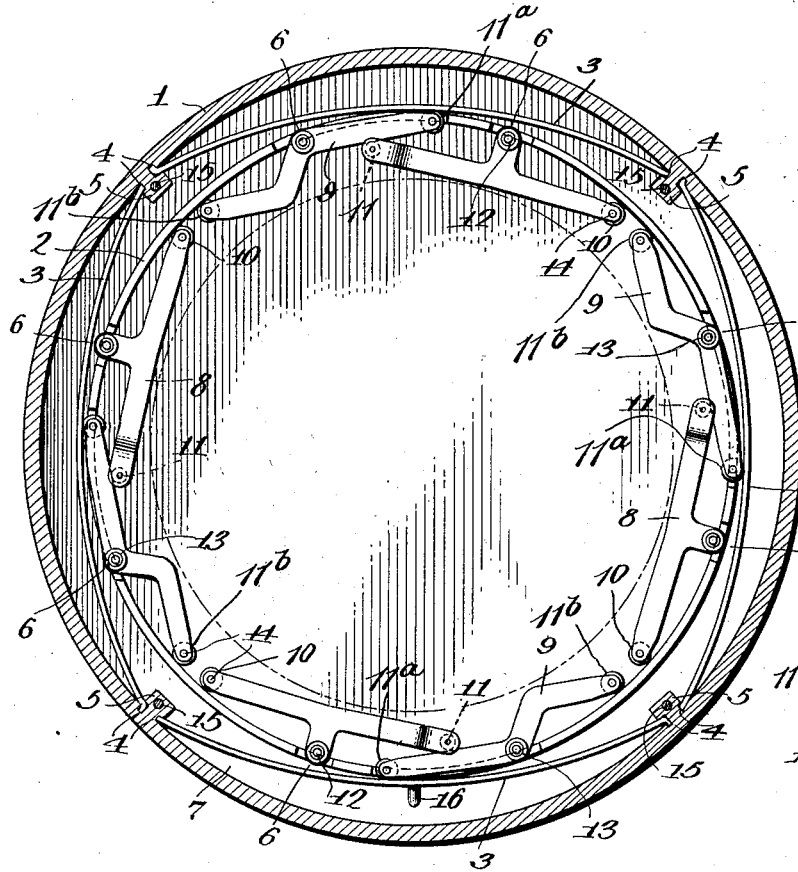
Figure 2:
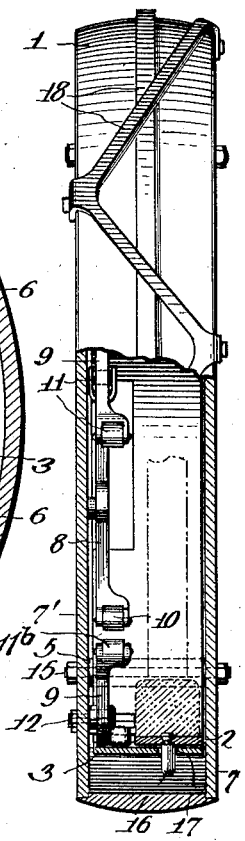
Figure 4:
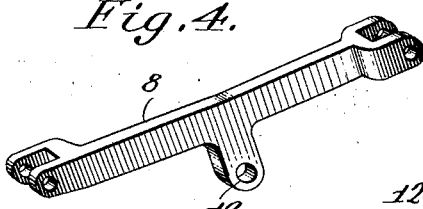
Figure 5:
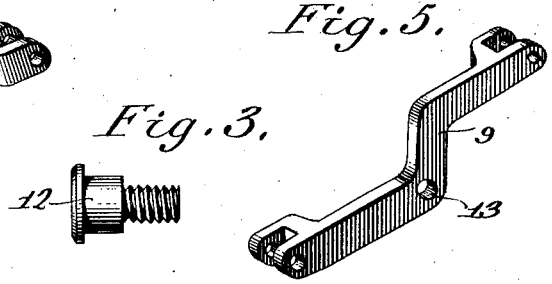
Figure 3:
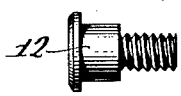
Figure 6:
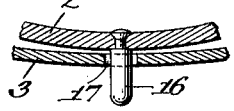

In the accompanying drawings, which serve to illustrate my invention: Figure 1 is an elevation view of my improved tire, the outer steel rim being in section and one cover plate being removed. Fig. 2 is an end elevation view, parts being broken away for the sake of clearness. Fig. 3 is a detail view of the pivot for levers. Figs. 4 and 5 are detailed views of the levers employed. Fig. 6 is a detail section through floating rim and spring showing driving lug.

Referring more particularly to the drawing, 1 indicates the outer rim of the tire and 2 the floating rim.

3 indicates the stout steel springs which are mounted in grooves 4 formed at the base of the lugs or extensions 5 on the outer rim 1.

Pivoted at the points 6 to the outer plate or cover 7 is a series of two styles of levers, one shown at 8 and one at 9. The levers are best shown in Figs. 4 and 5.

The felly of the vehicle wheel is, in practice, to be fastened to the floating rim of my improved tire as shown in dotted lines in Fig. 2. Each lever 8 is provided at one end with a roller 10 which bears against the inner side of the floating rim and each of said levers 8 has a roller 11 at the opposite end. Each lever 9 has a roller 11ª at one end which bears against one of the springs 3 and has a roller 11ᵇ at the opposite end which bears against the inner side of the floating rim. One arm of each lever 9 is engaged by the roller 11 of the companion lever 8. Hence, when the weight of the vehicle forces the floating rim downwardly the pivotal points 6 of the levers 8 and 9, being fixed in the outer cover plate 7, the rollers 11ᵇ will cause said levers to partly turn so that their rollers 11ª will communicate an outward thrust to all of the springs. The rollers 10 of the levers 8 will also cause said levers to partly turn and their rollers 11 will exert an outward thrust on the levers 9 at points near the rollers 11ª. Hence the weight will be equally distributed to all of the springs 3 instead of being imposed only upon the lower spring and an even pressure is secured at all points of the tire, practically as in the case of a pneumatic tire.

The pivots 6 are made preferably by placing a shouldered bolt 12 through the holes 13 in the levers 8 and 9. The rollers 10 and 11 are held in place in any desired manner, such as by pins 14. The outside plates 7 and 7' are bolted to the tire through holes 15 in lugs 5 of the rim 1, the said plates thereby holding the spring 3 from sidewise movement.

If the levers 8 and 9 interfere with the floating rim 2 the said floating rim may be cut away wherever necessary to allow free movement of the said levers and allow them to pass by said floating rim, the levers being placed at the side of tire to allow room for the main wheel.

To allow the wheel to be driven without turning the floating rim in relation to the outer rim 1, I provide a lug 16 on the floating rim which extends through a suitable opening 17 in one of the springs 3. In this manner it is readily seen that when the floating rim 2 is driven in the proper direction that the lug 16 will engage the spring 17 and drive the outer rim therewith. If desired, the outer rim 1 may be constructed with ribs 18 thereon to provide an anti-skidder for the tire, or the anti-skidder may be made separate and be bolted to the sides of said outer rim.

While I have shown a particular construction of the various parts which are employed in my invention, I do not wish to be confined to the exact details shown, it being understood that various forms of levers might be used to advantage and also could be placed in various positions without departing from the spirit and scope of my invention.

What I claim as new and desire to secure by Letters Patent is:

1. A wheel of the class described comprising a supporting member, an outer rim connected thereto, springs in said outer rim, a floating inner rim, and pairs of levers pivotally connected to the supporting member, each of said levers exerting outward thrust at its outer end against the inner rim, the inner end of one lever of each pair exerting outward thrust against the inner end of its companion lever, the inner ends of the last mentioned levers exerting outward thrust on the springs and hence also on the outer rim.

2. A wheel of the class described comprising a supporting member, an outer rim connected thereto and having studs on its inner side, curved springs in the outer rim and bearing at their ends against said studs, a floating inner rim, and pairs of levers pivotally connected to the supporting member, each of said levers exerting outward thrust at its outer end against the inner rim, the inner end of one lever of each pair exerting outward thrust against the inner end of its companion lever, the inner ends of the last mentioned levers exerting outward thrust on the said springs and hence also on the outer rim.

3. A wheel of the class described comprising a supporting member, an outer rim connected thereto and having studs on its inner side, curved springs in the outer rim and bearing at their ends against said studs, a floating inner rim, pairs of levers pivotally connected to the supporting member, each of said levers exerting outward thrust at its outer end against the inner rim, the inner end of one lever of each pair exerting outward thrust against the inner end of its companion lever, the inner ends of the last mentioned levers exerting outward thrust on the said springs and hence also on the outer rim, and means connecting the floating rim to one of said springs to cause the floating rim and outer rim to revolve in unity.

4. A device of the character described comprising an outer rim, springs mounted in said outer rim, a floating rim, within said outer rim, levers pivoted to said outer rim, one end of each lever engaging the inner surface of said floating rim, the opposite ends of said levers being adapted to force outwardly against the pressure of said springs when said floating rim forces any of the engaging ends of said levers in an outwardly direction, one of said springs having an opening and a lug on said floating rim adapted to enter said opening whereby said outer rim is rotated with said floating rim, substantially as set forth.

5. A device of the character described comprising an outer rim, lugs on the interior of said outer rim having recesses in their sides, levers mounted in said rim, a floating rim adapted to engage certain ends of said lever, springs mounted on the inner circumference of said outer rim and having their ends extended into said recesses, said floating rim adapted to engage certain ends of said levers and force them inwardly, thereby forcing the opposite ends of said levers outwardly against the pressure of said springs, and means whereby said floating rim is connected to said outer rim so as to drive said outer rim therewith, substantially as set forth.

GEORGE W. KILLIN.

Witnesses:
DAVID E. JOHNSON,
F. L. HERSEY.

---

Copies of this patent may be obtained for five cents each, by addressing the "Commissioner of Patents, Washington, D. C."